United States Patent

[11] 3,622,398

| [72] | Inventors | Satoshi Sekido<br>Kadoma-shi;<br>Minoru Yamashita, Hirakata-shi; Masao<br>Matsumoto, Neyagawa-shi, all of Japan |
|---|---|---|
| [21] | Appl. No. | 846,706 |
| [22] | Filed | Aug. 1, 1969 |
| [45] | Patented | Nov. 23, 1971 |
| [73] | Assignee | Matsushita Electric Industrial Co., Ltd.<br>Oaza Kadoma, Kadoma-shi, Osaka, Japan |
| [32] | Priorities | Oct. 4, 1968 |
| [33] | | Japan |
| [31] | | 43/72660;<br>Dec. 2, 1968, Japan, No. 43/88819; May 23, 1969, Japan, No. 44/11239 |

[54] SEALED TYPE STORAGE BATTERY
5 Claims, 10 Drawing Figs.

[52] U.S. Cl. .................................................. 136/179,
136/180
[51] Int. Cl. .................................................. H01m 1/08
[50] Field of Search .......................................... 136/179,
180, 6, 3, 157, 163, 26–27, 24, 28, 29, 177–178

[56] References Cited
UNITED STATES PATENTS

| 2,465,202 | 3/1949 | Craig .......................... | 136/179 |
|---|---|---|---|
| 2,687,449 | 8/1954 | Gulick et al. ................. | 136/179 |
| 2,951,106 | 8/1960 | Ruetschi ...................... | 136/6 |
| 3,038,954 | 6/1962 | Pattison et al. ............... | 136/179 |
| 3,080,440 | 3/1963 | Ruetschi et al. .............. | 136/3 |
| 3,258,360 | 6/1966 | Kordesch ..................... | 136/6 |
| 3,287,174 | 11/1966 | Hennigan et al. ............. | 136/179 |
| 3,328,208 | 6/1967 | Ryhiner et al. ............... | 136/157 |
| 3,356,533 | 12/1967 | Carson, Jr. ................... | 136/6 |

*Primary Examiner*—Anthony Skapars
*Attorney*—Stevens, Davis, Miller & Mosher

ABSTRACT: A new type of enclosed storage battery which comprises a (gas phase) catalyst capable of combining oxygen and hydrogen into water, an oxygen supply unit for automatically supplementing oxygen shortage and a solid electrolyte, and which is cheap in price, easy to handle, large in capacity and long in service life.

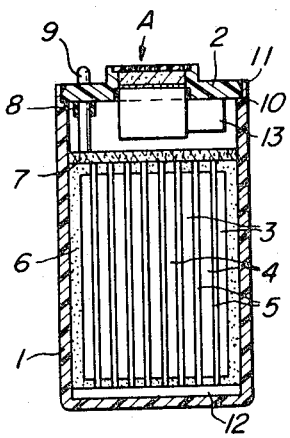
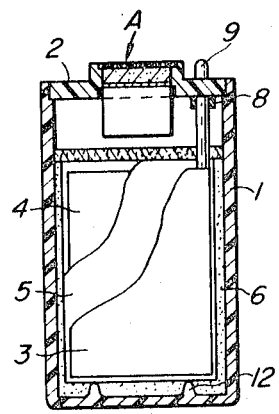
FIG. 1a  FIG. 1b
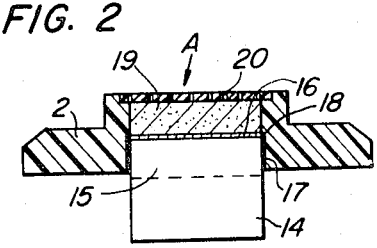
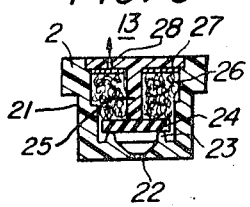
FIG. 2  FIG. 3
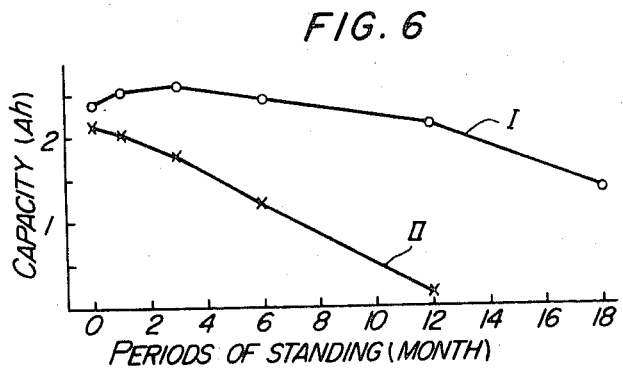
FIG. 6

SEALED TYPE STORAGE BATTERY

The present invention is to provide a new type of enclosed storage battery which comprises a waterproof, electolyte-resisting oxygen supplementing element having very fine air-passage holes and provided at a portion of the battery container in such a manner that diffusion of gases into and from the battery is permitted only therethrough, and a catalyst capable of recombining oxygen and hydrogen into water through a gas phase reaction, whereby an oxygen shortage which would otherwise occur during charge, discharge and storage of the battery can be avoided, and the capacity of the battery is increased and the service life thereof is prolonged as far as possible.

In charging a storage battery, oxygen and hydrogen are generally evolved intensely from the positive electrode and the negative electrode respectively upon completion of charging of the active materials of said electrodes, and as a result water in the electrolyte is decreased. Therefore, the conventional storage batteries had the disadvantages that the electrolyte must be supplemented or the specific gravity of the electrolyte must be adjusted from time to time, which renders the maintenance of the storage battery cumbersome, and that the electrolyte is scattered at the time of releasing the gases generated in the battery and attaches to the equipment in the vicinity of the battery, possibly causing damage to said equipment.

In view of the above, various methods have been proposed to provide a storage battery in a sealed form and thereby to render the handling of the battery easy and eliminate the above-described danger. The methods of sealing a storage battery are broadly classified into three types. Namely, the most simple method is to recombine the oxygen and hydrogen, generated during charging of the battery, into water through a gas phase reaction. However, this type of enclosed storage battery has never been successfully put into practical use for the reasons to be described later.

The first type of enclosed storage battery which has successfully been used is Ni–Cd alkaline storage battery and a storage battery of this type has already been put on the market in which the oxygen evolved at the positive electrode is absorbed by the negative electrode at an equal rate and thereby generation of hydrogen at the negative electrode is prevented, enabling the battery to maintain its sealed condition. This type of enclosed storage battery, however, had the drawback that the capacity thereof is subjected to limitations and further, the service life is relatively short because the amount of electrolyte is restricted as compared with the vented-type storage battery. On the other hand, a lead storage battery could not be sealed by this method by reason of the fact that, since lead which is the active material of the negative electrode is electrochemically more negative than hydrogen, a certain amount of hydrogen gas is generated at the negative electrode during charging, when the oxygen is absorbed by the negative electrode.

The second type of enclosed storage battery is one which comprises the third electrode, having catalytic activity, connected to the negative electrode or the positive electrode through a diode or a resistor, with a portion thereof immersed in the electrolyte, whereby oxygen and hydrogen are ionized individually and consequently reverted to water. However, this type of storage battery has the drawback that it requires a large amount of catalyst and, therefore, is expensive; that complete charging of the positive electrode in particular cannot be attained due to a potential limitation of the auxiliary electrode (the third electrode) and the capacity of the battery tends to decrease; and that the size of the battery cannot be reduced because the auxiliary electrode requires a large air space.

It is conceivable that a simple and ideal enclosed storage battery over those of the types described above could be obtained if the oxygen and hydrogen generated vigorously from both electrodes during charging can be chemically reverted to water through a gas phase reaction using a catalyst. A battery of such type was proposed in 1912 by T. A. Edison for the first time but none of the batteries proposed ever since has successfully been put in practical use. One of the major reasons is that the ratio between the hydrogen and the oxygen, generated during charging, does not perfectly coincide with the stoichiometric ration of 2:1, with the tendency of the hydrogen being generated in greater amount than oxygen. This phenomenon may be attributed to the oxidation of the positive during charging, resulting in an oxygen shortage and the formation of $H_2O_2$, and elimination of it is a problem which is very hard to solve by the present technical level of the storage battery industry. It would rather be easier to supply oxygen from the outside. Another major reason is that it has been impossible to obtain a highly active but inexpensive catalyst which is capable of stable operation over an extended period under a condition of being exposed to a mist of an electrolyte.

The present invention aims to propose a new type of oxygen supplementing, gas phase, catalyst-type enclosed storage battery which obviates the aforesaid drawbacks of the conventional ones.

According to the present invention, a water-repellent, electrolyte-resisting porous body having very fine air passages formed therein and serving as an oxygen supplementing element is provided at a portion of the battery container for supplementing oxygen therethrough, so that the gaseous phase interior of the battery may be communicable with the atmosphere only through said porous body, and further a $H_2$–$O_2$ combining catalyst capable of stable operation over an extended period is provided within the battery, whereby $H_2$ and $O_2$ generated within the battery are reverted into water through the catalyst bed, whilst an oxygen shortage occuring in the battery is supplemented from the outside through the porous body, that is, the oxygen supplementing element, so as to accomplish the gas phase reaction and enable the battery to remain in its enclosed state. Here, it is important that the air passages in the porous body must be so fine as not to permit the hydrogen generated within the battery or the electrolyte mist to escape to the outside therethrough.

When charging is started with air sealed in the battery, oxygen and hydrogen are generated within the battery upon completion of the charging. In this case, hydrogen is generated at a rate equal to the rate of the charging current but oxygen is generated at a slightly lower rate than hydrogen. Such a tendency is more apparent when the is newer and the charging current is larger. The hydrogen and oxygen thus generated are combined into water at the ratio of 2 to 1 through a gas phase reaction by the action of the catalyst but if oxygen is not supplemented, hydrogen is gradually accumulated in the battery, building up an internal pressure. According to the present invention, however, an oxygen pressure difference occurs between the interior and exterior of the battery communicating with each other through the oxygen supplementing element and thus oxygen is supplied into the battery through said oxygen supplementing element. The amount of oxygen supplied from the outside per unit time can be represented by the following formula: $v = D \cdot A \cdot \Delta Po_2 / d$     (1)
wherein $D$ is the diffusion coefficient of oxygen, $A$ is a total average cross section of the fine air passages in the porous body, $d$ is the thickness of the porous body, and $\Delta Po_2$ is an oxygen pressure difference between the atmosphere and the interior of the battery.

The oxygen supplied through the porous body from the atmosphere is combined with the hydrogen, generated from the negative electrode and reaching the surface of the catalyst, to form water through a gas phase reaction by the action of said catalyst. In this case, the diffusion velocity of the oxygen from the atmosphere is regulated by the difference between the partial pressure of oxygen in the atmosphere and the partial pressure of oxygen in the battery or, in other words, by the amount of oxygen shortage in the battery. On the other hand, the hydrogen generated within the battery is readily escapable but will be reverted to water while the partial pressure thereof is relatively low if the catalyst used is highly active, and will not be substantially permitted to escape to the outside if the air passages in the oxygen supplementing element are so fine as to allow only slow gas diffusion, with the result that no decrease of electrolyte will occur in the battery. In practice, the electrolyte is not substantially decreased. This suggests such a reaction mechanism in which hydrogen is combined with the oxygen supplied from the outside and adsorbed on the catalyst, to be reverted to water immediately upon collision against the latter. No transfer of nitrogen takes place since the interior and exterior partial pressures of the battery are equal.

Because of the gases being balanced as described above between the interior and exterior of the battery, the hydrogen generated during charging is entirely reverted to water within the battery by the action of the catalyst, whereby the internal pressure of the battery can be maintained substantially constant and the electrolyte is not decreased, and furthermore dispersion of the electrolyte mist can be completely prevented by the water-repellent porous body. Therefore, the battery can be used as a completely enclosed type of storage battery. In addition, the charging and discharging characteristics of the battery can be fully demonstrated as in the case of a vented-type storage battery. Thus, it may be said that the battery of this invention is a new type of enclosed storage battery having features different from those of the conventional ones.

Features and advantages of the present invention will be described in detail with reference to the accompanying drawings, in which FIGS. 1a and 1b are cross-sectional views of a battery of the invention;

FIG. 2 is a cross-sectional view of a catalyst and an oxygen supplementing element;

FIG. 3 is a cross-sectional view of a safety valve;

FIG. 6 is a graph showing the result of shelf test of a conventional battery and a battery of the invention;

Figure 4:
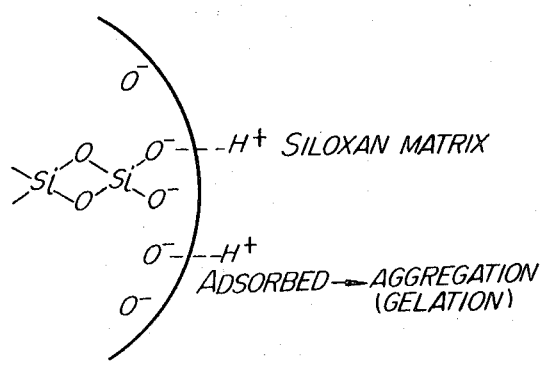
FIG. 4 is a diagram showing the siloxan structure.

The present invention will be described in further detail with reference to an embodiment thereof.

An example of the battery structure according to the present invention is shown in FIGS. 1 to 3 inclusive. Namely, FIGS. 1a, and 1b are vertical sectional views as viewed in directions 90° different relative to each other respectively, and FIG. 2 is a vertical sectional view of a catalyst and an oxygen supplementing element. FIG. 3 is a vertical sectional view of a safety valve. The battery comprises a casing 1 made, for example, of polystyrol resin, a group of lead negative electrodes 3 and lead dioxide positive electrodes 4 disposed in said casing 1 with a separator 5 interposed between adjacent negative and positive electrodes, a prescribed amount of sulfuric acid-containing colloidal silica electrolyte 6 filling the space between said casing and said electrode group, and an absorbent layer 7 consisting of glass fiber and disposed on top of said electromotive elements (for shielding free dilute sulfuric acid emerging from the electrolyte). A lead 9 of the negative electrodes extends through a tubular rubber bushing 8 to project outwardly of the casing 1, while a lead of the positive electrodes is located on the near side of the sections 1a and 1b and is not shown. A cover 2 is provided with a catalyst and an oxygen supplementing element A, and fitted in a rectangular shoulder 10 at the open top end of the casing 1 and secured thereto by means of an adhesive as at 11. On the bottom of the casing 1 are provided saddles 12 to prevent shorting caused by the electrode active materials falling from the respective electrodes and accumulated on the bottom of the casing. In the embodiment shown, two of these saddles are provided perpendicularly of the electrodes 3, 4. The battery is also provided with a safety valve 13 which is actuated to exhaust gases when the internal pressure of the battery rises abnormally high.

Referring to the catalyst and the oxygen supplementing element A, the catalyst 14 and an oxygen supplementing filter 15 are molded integrally with each other and a gas permeation control film 16 of polystyrol resin is formed on the top surface of said filter 15. The assembly thus obtained is fitted into an annular shoulder 18 formed in a hollow cylindrical neck portion of the cover 2 from the bottom thereof, and secured thereto by means of an adhesive 17. The cavity formed in the hollow cylindrical neck portion above the gas permeation control film 16 is filled with litharge cement 19 poured and solidified therein, and the top face of said litharge cement 19 is covered with a resin plate 20 having small holes perforated therein.

The safety valve 13 is provided as part of the cover 2, just for dealing with an abnormal condition occurring in the battery, and is not used under normal operating conditions. Namely, when the internal pressure of the battery has abnormally risen, the gases interior of the battery pass through an aperture 22 formed in the bottom wall of a valve casing 21, integral with the cover 2, and after forcibly opening a valve 24 which consists of a flat rubber disc and seats on an annular rib 23 while being depressed by a depressing member 25, pass through an electrolyte absorbent 26 and a leakage indicating element 27, provided in a space above said valve 24, to be released to the outside through an exhaust hole 28 formed in said depressing member 25, said leakage indicating element 27 being impregnated with an indicator adapted to be colored by the electrolyte. Therefore, the mist of electrolyte entrained in the gases is removed during travelling of the gases along a long path as described above and by being absorbed by the electrolyte absorbent 26 and the leakage indicating element 27, and there is substantially no danger of the electrolyte leaking to the outside. If the electrolyte leaks to any extent, such leakage is made known to the user by the color of the leakage indicating element 27, so that the user can stop the use of the battery.

The catalyst 14 is molded of a powdery catalyst material which is produced by a process comprising kneading a fine powder of artificial graphite with a hydrochloric acid solution of $PdCl_2$, drying the mixture at 80° to 100° C. to sufficiently adsorb the $PdCl_2$ on the artificial graphite powder, reducing the $PdCl_2$ to Pd black with aqueous caustic soda and concentrated formalin solution and after washing with water, drying at 50° to 60° C. The amount of Pd is only required to be 1 percent by weight of the graphite. Therefore, the Pd catalyst, which is more active and more stable than Pt black, can be produced at lower cost. Then, 75 parts of the powdery catalyst material thus obtained are mixed with 25 parts of a fine powder of fluorocarbon resin and a prescribed amount of the mixture is placed in a cylindrical metal mold and pressed therein lightly. Separately, 75 parts of a Pd-free fine powder of artificial graphite and 25 parts of a fine powder of fluorocarbon resin are mixed, and a prescribed amount of the mixture is placed in the metal mold on top of the previously charged mixture and molded integrally therewith under a pressure of 100 to 200 kg./cm.². The molded body is subjected to a heat treatment at a temperature of 300° to 390° C. in an inert gas atmosphere, whereby the water-repellent, rigid catalyst 14 and filter 15 are obtained in the form of a unitary piece.

In the past, active carbon, silica, alumina and diatomites have frequently been used as a carrier for catalyst as a result of attaching importance only to the activity thereof. However, these carriers unexceptionally had the disadvantage that when they are used under a condition of being brought into contact with a mist of sulfuric acid, they are wetted or subjected to a chemical change and, therefore, cannot maintain their activities for a prolonged period, and moreover they tend to cause explosion due to an abrupt temperature rise resulting from local reaction. According to the study conducted by the present inventors, it has been found that while it is necessary to subject the catalyst to a waterproofing treatment for the purpose of imparting water-repellency thereto, it is also necessary for the carrier used to have a hardly wettable property *per se* and that a catalyst having high thermal conductivity shows a good performance. This is because even if the catalyst, which is of course required to be active, is rendered water-repellent by a waterproofing treatment, in the vicinity of the reaction activation point the catalyst is in a condition wherein the water repellent is not present or is present in a very small amount, so that the catalyst is attacked and wet by a fine mist of electrolyte and deteriorates quickly, unless the carrier therefor is of a hardly wettable material. It is also to be noted that the catalyst becomes heated locally as it deteriorates and the number of reacting activation points decreases gradually, and approaches the flash point of the detonating gas. Thus, it becomes necessary to quickly transfer the reaction heat.

The fine powder of artificial graphite mentioned in the above example is the carrier which best meets these conditions. Silica and alumina frequently used heretofore deteriorate *per se* upon absorbing sulfuric acid, while crystalline alumina is poor in activity although it is hardly wetted. Active carbon has excellent activity but is readily wetted and quickly deteriorated. Graphite-base carriers meet the purpose described but amorphous graphite contains a large amount of impurities, such as ash, and, therefore, is wetted relatively readily and is incapable of maintaining its activity for a long period. Artificial graphite is active, hard to wet and excellent in heat conductivity, and can be used as a catalyst carrier capable of stable operation over an extended period. The amorphous graphite can be an excellent carrier when the impurities contained therein are artificially removed therefrom, though it is somewhat inferior to the artificial graphite in respect of stability. The so-called flaky graphite which is highly crystalline is too poor in activity to be used. The present inventors conducted a test on these substances as catalyst carrier, the result of which is shown in table 1 below:

In the embodiment described and illustrated herein, the catalyst 14 and the oxygen supplementing filter 15 are molded integrally with each other. This is for the purpose of letting the hydrogen gas, generated within the battery, to always pass through the catalyst when it escapes to the outside, and thereby absorbing it completely by said catalyst. However, if the catalyst is sufficiently active, no hydrogen gas substantially escapes to the outside even when the catalyst and the filter are provided separately, because the partial pressure of hydrogen gas in the battery is maintained low. The filter serves not only to supply oxygen therethrough and prevent escape of hydrogen gas, but also to prevent scattering of the electrolyte mist and act as heat barrier to prevent the reaction heat from being directly transmitted to the battery casing. However, with the filter only, the amount of gas supplied from the outside cannot be properly adjusted and the hydrogen gas is possibly allowed to escape to the outside, even when the particle size of the graphite and the amount of the water repellent are varied. It is for this reason that the thin film 16 of polystyrol resin is formed on top of the filter to control the oxygen supplied from the outside. The amount of oxygen which actually becomes short within the battery corresponds to a current value not greater than 100 hour rate in the initial state of use of the battery and to a current value not greater than 1000 hour rate upon lapse of a long period, though variable depending upon the capacity of battery and the charging current. For instance, an oxygen supply rate of 2 cc./hr. at highest is sufficient for a 10 Ah battery. The thickness of the polystyrol film is variable depending upon the rate at which oxygen gas is supplemented but said film is formed by flowing a solution of polystyrol in benzene over the surface of the filter in a small thickness, allowing the resultant film to dry slowly and then forming microscopic holes therein. In an actual battery, the film was formed using a benzene solution containing 20 percent by weight of polystyrol. The relationship between the concentration of polystyrol used and the permeation velocity of oxygen gas is exemplified in table 2 below:

TABLE 1.—LIFE TEST ON CATALYSTS COMPRISING VARIOUS CARRIERS IN GAS PHASE REACTION

| Current | Item | Carrier |||||||
|---|---|---|---|---|---|---|---|---|
| | | Alumina | Silica | Glass fiber | Asbestos fiber | Active carbon | Amorphous graphite | Amorphous graphite (treated) | Artificial graphite |
| 0.3 amps | Service life (hr.) | 95 | 80 | 120 | 230 | 140 | 2,500 | >5,000 | >5,000 |
| | Phenomenon of deterioration. | Explosion | Pressure rise. | Pressure rise. | Pressure rise. | Explosion | Pressure rise. | None | None. |
| | Cause of deterioration | Fusion of alumina. | Wetting | Wetting | Wetting | Wetting | Wetting | do | Do. |
| 1 amp | Service life (hr.) | 0.5 | 0 | 2 | 3 | 2 | 200 | 2,150 | 2,500. |
| | Phenomenon of deterioration. | Explosion | Pressure rise. | Explosion | Explosion | Explosion | Pressure rise. | Pressure rise. | Pressure rise. |
| | Cause of deterioration | Fusion wetting. | Wetting | Wetting | Wetting | Wetting | Wetting | Wetting | Wetting. |

Notes:

1. The test was conducted by placing the catalysts individually in an air space in a sealed container containing dilute sulfuric acid as a electrolyte, and conducting the current specified in the above table across Pt wire electrodes immersed in the dilute sulfuric acid, to generate oxygen and hydrogen gases.
2. The amount of carrier in the respective catalysts is 0.75 g. (75percent) and the amount of Pd, used as catalytic metal, in each catalyst was 7.5 mg.
3. The respective catalysts were molded in the manner described hereinabove, using 0.25 g. (25percent) of polytetrafluorethylene powder as water repellent, and subjected to a heat treatment.
4. The service life was judged in terms of the period up to the time when the internal pressure of the sealed container has reached 500 mmHg. or the container exploded.

It will be seen from table 1 above that artificial graphite is best of all as a catalyst carrier.

The water repellent used is required to have resistance to heat, in addition to water repellency. At the present time, polytetrafluoroethylene and copolymer of ethylene tetrafluoride and propylene hexafluoride are most satisfactorily used.

Table 2

| Concentration of Polystyrol (w/o) | 5 | 15 | 25 | 35 |
|---|---|---|---|---|
| Permeation Velocity of $O_2$ (cc./hr.cm.atm.) | 42.5 | 19.3 | 6.8 | 2.0 |

Note:

The permeation velocity of $O_2$ is indicated by a value corresponding to $D$ in formula 1 and in the embodiment shown the oxygen permeation velocity of 1.1 cc./hr. corresponds to the case of $D=10$ under the condition of $\Delta P_{O_2}=100$ mmHg.

In the past, it was considered to use a synthetic resin film for the permeation of gas therethrough. However, an oxygen supply velocity as low as about one-tenth or one-hundredth of the value depicted above is only obtainable even with a polyethylene film which is highest in permeability. It is, therefore, necessary to form a countlessly perforated thin film on the porous body as in the present invention.

The litharge cement layer 19 is formed by drying and solidifying a mixture consisting of 20 parts of a mixture of lead oxide and metallic lead (containing 80 percent or more of PbO), 4.1 parts of glycerin and 1.5 parts of water. This layer prevents scattering of the sulfuric acid mist completely by absorbing the said mist and forms lead sulfate. In normal operation of the battery, the polystyrol film alone is sufficient for the sake of safety, but when gases are generated intensely during charging of the battery, a mist of electrolyte having a particle size of $1\mu$ or smaller tends to scatter to the outside. The litharge cement layer is provided as dual safety means to ensure safety under such conditions.

Lead oxide when mixed with glycerin solidifies slowly as a result of a reaction represented by the following reaction formula:

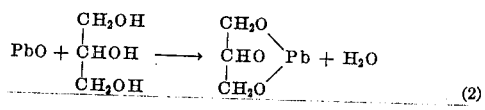

(2)

The water is added to adjust the size of cavities formed in the litharge cement layer. Upon contacting the litharge cement, the mist of sulfuric acid is absorbed by the remaining lead oxide and lead, and the litharge cement, and the litharge cement itself is converted into lead sulfate, releasing water and glycerin therefrom. Since the reaction velocity is very high, the mist of sulfuric acid is not allowed to scatter to the outside and the water and glycerin released are readily evaporated because they are small in amount.

The oxygen permeation velocity through the litharge cement layer must be about the same as or higher than that through the polystyrol film. In the formation of the litharge cement layer, the workability, particularly the viscosity of the cement mixture suitable for pouring operation, and the length of solidifying time are important. Furthermore, the litharge cement is required to retain its rigidity, not to substantially change the oxygen permeation velocity therethrough and to be resistive to electrolyte even after absorbing the sulfuric acid mist.

The properties of the litharge cement layer with respect to the composition thereof are shown in table 3 below:

TABLE 3.—COMPOSITION AND PROPERTIES OF LITHARGE CEMENT LAYER

| | Property | | | | | | | | | | |
|---|---|---|---|---|---|---|---|---|---|---|---|
| | Oxygen permeation velocity D (cc./hr. cm. atm.) | | | | Resistance to electrolyte | | | | Workability | | |
| Amount of water added (g.) | 0 | 1 | 2 | 3 | 0 | 1 | 2 | 3 | 0 | 1 | 2 | 3 |
| Amount of glycerin (g.): | | | | | | | | | | | | |
| 2.07 | | 3.8 | 14.9 | 19.3 | X | △ | ○ | X | X | X | △ | ○ |
| 4.13 | 4.7 | 9.9 | 14.4 | 20.5 | ○ | ○ | ○ | ○ | △ | ○ | ○ | ○ |
| 6.20 | 7.5 | 18.9 | 24.3 | 27.8 | ○ | ○ | △ | △ | △ | ○ | ○ | ○ |
| 8.26 | 8.6 | 24.0 | 28.5 | 34.6 | X | X | X | X | ○ | ○ | ○ | ○ |

Note.—The amounts of glycerin and water added are per 20 g. of litharge lead powder. The stoichiometric ratio of lead oxide and glycerin is 20 g.:8.26 g. The numerals enclosed by a circle show the optimum conditions when evaluated from the overall point of view.

Figure 5:
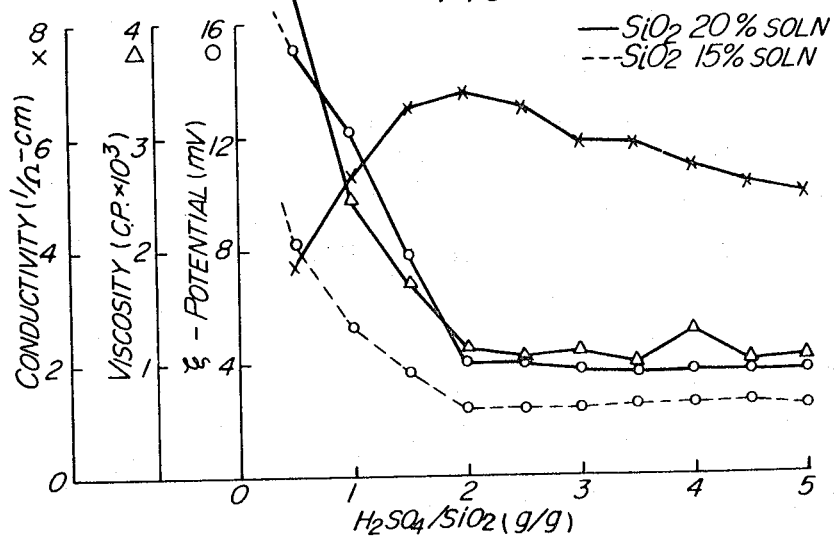
FIG. 5 is a graph showing relations between the conductivity, viscosity and $\zeta$-potential of $SiO_2$ colloid and the ratio $H_2SO_4/SiO_2$.

In the embodiment described herein a solid electrolyte consisting of silicon oxide $SiO_2$ and dilute sulfuric acid is used. This is for the purpose of minimizing the danger of direct contact with electrolytic solution or outside scattering of a mist of electrolytic solution, and also for enabling the battery to be used in any position. The solid electrolyte used in the embodiment is prepared by adding a predetermined amount of concentrated sulfuric acid little by little to an aqueous solution containing fine colloidal particles of silicon oxide $SiO_2$, while cooling. In general, the colloidal particle of $SiO_2$ in an aqueous dispersion medium has the structure of siloxan as shown in FIG. 4 and has minus electric charge by reason of the oxygen atoms on the surface thereof. The $SiO_2$ particles which have a strong tendency of being combined with each other into a large molecule are maintained stable due to the repulsion of the minus electric charge. However, with sulfuric acid added thereto, the particles lose the minus electric charge as a result of adsorbing hydrogen ion $H^+$ and aggregate into a gel to form a solid electrolyte. The amount of $H^+$ adsorbed is variable depending upon the shape and size of the colloidal particle. The colloidal particles of $SiO_2$ used in the embodiment have a particle size of about $10\mu$ and when 2 parts of concentrated sulfuric acid $H_2SO_4$ is added to 1 part of $SiO_2$ in weight ratio, the colloidal particles of $SiO_2$ are saturated with the hydrogen ions adsorbed thereby and the interfacial electrokinetic potential ($\zeta$-potential) representing the electric charge quantity of the double layers of the colloidal electrolyte reaches a state of equilibrium, with no substantial change in electric conductivity and viscosity. Such property is shown in FIG. 5. It was verified through microscopic observation that the colloidal particles of $SiO_2$ aggregate with sulfuric acid partially adsorbed thereon before the saturation point is reached but they form a uniformly dispersed gel after the saturation point has been reached. This saturation point, i.e. the silicon oxide to sulfuric acid ratio by weight of 1:2, is unchanged even when the amount of water contained is changed.

Therefore, the amount of sulfuric acid present in the solid electrolyte must be at least twice as much as the amount of $SiO_2$ even when the battery has been completely discharged, with sulfuric acid fixed on the electrodes, and the properties of the electrolyte can be maintained substantially constant during charging or discharging by realizing such condition. In other words, sulfuric acid must be added at least in an amount which is the sum of the amount required for the gelatinization of the colloidal silica and the amount used for discharge operation.

Such quantity requirements were not known in the past. Therefore, satisfactory performance of the battery could not be obtained due to a shortage of sulfuric acid necessary for discharging operation or sulfation occurred for the same reason particularly when the battery was left to stand alone, whereby the shelf life of the battery is shortened. The present inventors conducted a shelf test on a battery (I) according to the present invention which comprises a silica solid electrolyte (the specific gravity with respect to the sulfuric acid concentration in the dilute sulfuric acid being 1.36), and a conventional battery (II) which comprises an electrolyte consisting of a colloidal silica solution with concentrated sulfuric acid added thereto in an amount which is the sum of the amount 100 percent of that required for discharging operation and the amount only 40 percent of that required for gelatinization (said electrolyte corresponding to a dilute sulfuric acid of specific gravity of 1.28 at 20° C.), in a shorted condition after the batteries had been completely discharged. The result of the test is shown in FIG. 6. In the chart of FIG. 6, the capacity curve of each battery was drawn by plotting the maximum capacity obtained during three cycles of charging and discharging, each consisting of 10-hour charging at 0.3A and discharge at 0.4A until the voltage drops to 1.75 v. As a result, it was confirmed that the battery (I) had a greater initial capacity than the battery (II) and excellent shelf properties in the state of discharge. In this case, the electrodes and the separator were impregnated with dilute sulfuric acid having a specific gravity of 1.28. The composition of the solid electrolyte used is shown in table 4 below:

TABLE 4.—COMPOSITION OF SOLID ELECTROLYTE

| Battery No. | 15% colloidal SiO₂ solution g. | Amount of conc. H₂SO₄ added, g. | Amount of SiO₂ g. | Total volume, cc. | In a total volume of 25 cc. | | |
|---|---|---|---|---|---|---|---|
| | | | | | Amount of SiO₂, g. | Amount of H₂SO₄ for— | |
| | | | | | | Gelatinization, g. | Discharge, g. |
| I (present battery) | 100 | 76.9 | ¹ 15 | 126.2 | 3.04 | 6.08 | 9.15 |
| II (conventional battery) | 100 | 52.3 | ² 15 | 111.4 | 3.37 | ³ 2.58 | 9.15 |

¹ 8.5%.
² 9.8%.
³ 38%.

Figure 7:
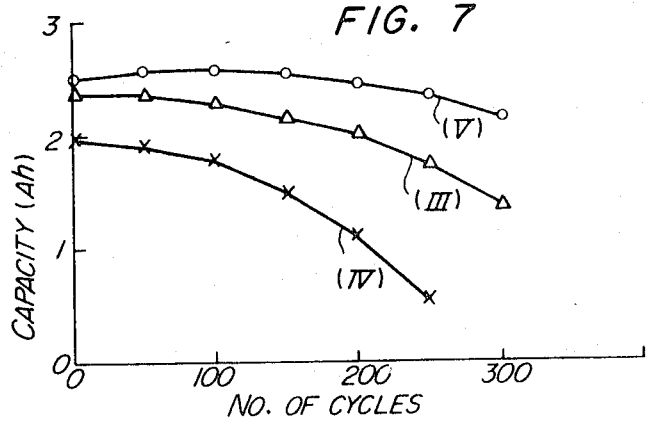
FIG. 7 is a graph showing performances of various batteries.

The sulfuric acid, during charging and discharging, is transferred between the gelatilized electrolyte and the electrodes and since diffusion of sulfuric acid in the gel is slow, it is preferable that the sulfuric acid is present as close to the electrodes as possible. For this purpose, it is recommendable to fix the sulfuric acid on the electrodes or to impregnate the electrodes and separator with the sulfuric acid. A battery (III) which had been completely discharged for fixing sulfuric acid on the electrodes during assembly of the battery, and a battery (IV) which was composed of electrodes which had been charged by increasing the sulfuric acid concentration in a gelatinized electrolyte, although the total amount of sulfuric acid was the same for both electrodes, showed a performance difference as shown in FIG. 7. Furthermore, a battery (V) in which the electromotive elements, i.e. the electrodes and the separator had been impregnated with dilute sulfuric acid and an additional amount of sulfuric acid required for discharging had been fixed on the electrodes by conducting partial discharge, showed further excellent characteristic as compared with the battery (III) in which the electrodes had not been impregnated with dilute sulfuric acid. In the experiment, the respective batteries were individually subjected to a cycle test in which each battery was discharged for 2 hours at 0.5A (40 percent of the total capacity) and charged for 4 hours at 0.3A (120 percent of discharge capacity) repeatedly, and the capacities of the batteries were confirmed on every 50 cycles by discharging them at 0.5A.

Through the test, it was found that the total amount of sulfuric acid must be adjusted so as to cover the amount required for the entire discharge operation and also to have an amount of sulfuric acid remaining in the total electrolyte even after complete discharge, which is at least twice as much as the amount of silicic acid anhydride, and further that in composing a battery it is necessary to impregnate the electrodes and the separator with dilute sulfuric acid after said electrodes have been discharged, and then dispose said electrodes and said separator in a casing together with a gelatinized electrolyte containing a prescribed amount of sulfuric acid.

In case of a battery constructed as that of the present invention, hydrogen and oxygen gases are generated from both electrodes so vigorously that the ordinary solid electrolyte when used in such a battery tends to be cracked by the gases during charging of the battery, whereby the oxygen gas is allowed to contact the negative electrode, frequently causing self-discharge. Particularly, the oxygen gas generated upon decomposition of the positive electrode active material PbO₂ during storage of the battery and reaching the negative electrode is readily used for self-discharge and the self-discharge rate becomes excessively high. For preventing such undesirable phenomenon, it becomes necessary that a sufficient amount of fluid dilute sulfuric acid be present which may be included in the gel but not fixed on the electrodes. The amount of such fluid dilute sulfuric acid is determined mainly by the amount of water because the total volume of electrolyte chargeable in the battery is fixed and the required amount of sulfuric acid is substantially invariable (in practice, the amount of sulfuric acid required for the gelatinization of colloidal silica is varied slightly by the amount of silica, though the total discharge quantity remains unchanged). The present inventors prepared a gelatinous electrolyte by adding to a colloidal silica solution of a crack-free composition an amount of sulfuric acid required for the gelatinization of the silica and an amount of sulfuric acid required for discharge operation, and a battery of the construction as shown in FIG. 1 was produced using said gelatinous electrolyte. Various tests were conducted on the battery to find the influence of the composition of the colloidal silica solution on the solid electrolyte produced therewith, with the results shown in table 5 below:

TABLE 5.—COMPOSITION OF COLLOIDAL MATERIAL SOLUTION AND PROPERTIES OF SOLID ELECTROLYTE

| Colloidal solution SiO₂, percent. | 5 | 10 | 15 | 20 | 25 | 30 |
|---|---|---|---|---|---|---|
| Amount of colloid collected (g.). | 100 | 100 | 100 | 100 | 100 | 100 |
| Amount of H₂SO₄ required (g.). | 59.0 | 67.7 | 76.9 | 86.7 | 95.8 | 105.5 |
| State of gel | (¹) | Good | Good | (²) | (³) | (³) |
| Capacity of battery Ah | 2.65 | 2.63 | 2.65 | 2.62 | 2.45 | 2.10 |
| Self-discharge (percent/month). | 6.5 | 7.9 | 8.3 | 11.0 | 45.3 | 91.2 |
| Service life | 45 | 200 | 205 | 190 | 85 | 43 |
| Gelling time (min.) | ∞ { 300 (200) | 300 (150) | 200 (40) | 60 | Mixing (3) | Mixing (1) |

¹ Free dilute sulfuric acid floating.
² Good, slight crack.
³ Many cracks.

All of the gelatinous electrolytes used were prepared by adding a required amount of sulfuric acid to 100 g. of colloidal solution. The amount of sulfuric acid added was calculated on the basis of battery capacity of 2.6 Ah and electrolyte quantity of 25 cc. When the SiO₂ content is 5 percent, a uniform gelatinous electrolyte cannot be obtained due to the presence of free dilute sulfuric acid and the desired characteristics of gelatinous electrolyte cannot be obtained, whereas when the SiO₂ content is 25 percent or greater, numerous cracks occur in the electrolyte and the performance of the battery is degraded (for discharge at 0.5A), with increasing self-discharge. When the SiO₂ content is 20 percent, the electrolyte has some cracks therein, and the performance and self-discharge characteristic of the battery are lowered somewhat but may be improved by adding to the electrolyte about 3 percent of such substance as Teflon short fiber. In view of the above, it is believed that the upper limit of SiO₂ content in a usable electrolyte is 20 percent. A very satisfactory gelatinous electrolyte and an excellent discharge performance and self-discharge characteristic can be obtained when the SiO₂ content is 10 to 15 percent. However, with a SiO₂ concentration of 10 percent, the gelatinous electrolyte flows when the battery is subjected to a strong vibration in an inverted position. Therefore, an electrolyte containing not more than 10 percent of SiO₂ cannot be used unless it is held against movement by a sheet of glass fiber or the like as shown in FIG. 1. The service life of the battery was evaluated by a complete charging and discharge test in which the battery was charged for 10 hours with a constant voltage of 2.5 v. and discharged for 14 hours with a constant resistance of 5 ohms connected thereto. A satisfactory result was obtained when the SiO₂ concentration of the electrolyte was 10 to 20 percent. A SiO₂ concentration of 25 percent or higher resulted in deterioration of the battery due to a shortage of water, whereas a SiO₂ concentration of 5 percent resulted in the shedding of a large amount of active material from the electrode due to the unsatisfactory quality of the gelatinous electrolyte, with the accompanying result of shorting at the bottom of the battery. It is expected that the service life of the battery comprising 5 percent of SiO₂ can be prolonged by preventing such shorting by a separate measure.

From the foregoing, it will be understood that the water content in the electrolyte has a large influence on various performances, discharge capacity, self-discharge characteristic and service life of the battery and the concentration of colloid in the gelatinous electrolyte must be lower than the upper limit of the range within which the electrolyte can be prepared free of cracking. In the last line of table 5, there are shown the gelatinization time in the production of electrolyte by a numeral not in parentheses and the time required for the gelatinous electrolyte to solidify again after the aggregate of the gel was broken with strong stirring, by a numeral in parenthesis. For the sake of pouring the gelatinous electrolyte into the battery, it is advantageous that the solidification (gelatinization) time is long. In practice, a gelatinous electrolyte containing 25 percent or more or $SiO_2$ cannot be poured into the battery. In the embodiment shown, a conventional method was used for pouring the electrolyte, namely a major portion of the electrolyte was at first charged in the bottom of the battery container and then, after inserting the electromotive elements thereinto, the remainder of the electrolyte was poured onto the surface of the previously charged electrolyte. However, in case of a gelatinous electrolyte containing not more than 20 percent of $SiO_2$ the electrolyte could be charged in the battery satisfactorily by a simple method wherein the entire gelatinous electrolyte was charged after the electricity-generating elements had been disposed in the battery casing. A long gelatinization time also facilitates the production process of battery in that the gelatinous electrolyte can be poured over an extended period successively after the preparation thereof and, therefor, vigorous agitation is not always required.

Figure 8:
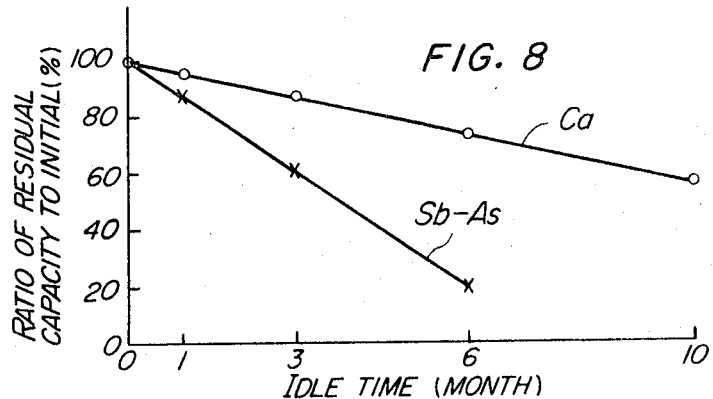
FIG. 8 is a graph showing the relation between a self-discharge characteristic and grid material.

It is also to be noted that while in the embodiment described above a Pb–Sb–As alloy was used as the grid of the negative electrode, the self-discharge characteristic of the battery can be further improved, as shown in FIG. 8, by the use of a Pb–Ca alloy which has been known as an alloy to minimize self-discharge.

Figure 9:
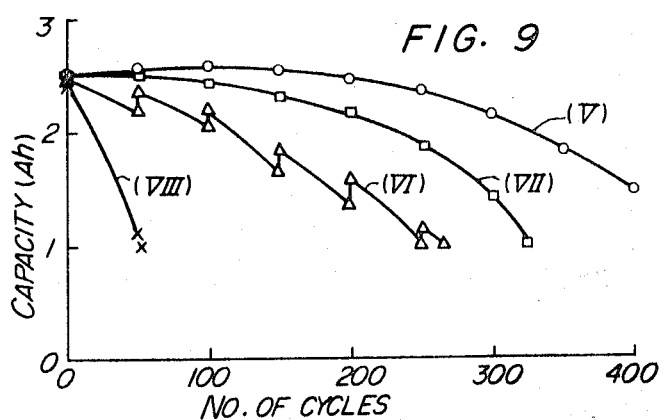
FIG. 9 is a graph showing the result of life test of various batteries.

Finally, the result of the charging and discharging life test conducted on the battery embodying the present invention and conventional vented type storage batteries comprising a dilute sulfuric acid electrolyte or a gelled electrolyte and having a safety valve, is shown in FIG. 9. In the test, the respective batteries were charged for 10 hours at 0.3A and discharged at 0.5A until the potential dropped to 1.75 v.

In the chart of FIG. 9, a curved V represents the battery according to the present invention (the same one as used in FIG. 7) and curves VI, VII and VIII represent the conventional vented-type storage batteries respectively. The batteries of curves VI and VII comprise dilute sulfuric acid as electrolyte, and the specific gravity of the electrolyte in the battery of curve VI was adjusted on every 50 cycles and that of the battery of curve VII on every five cycles. The battery of curve VIII comprises a gelatinous electrolyte but is different from the battery of this invention in that it is provided with an vent-type liquid plug in lieu of the oxygen permeable catalyst as used in the present invention. The batteries of curves V and VIII did not undergo supply of electrolyte or other maintenance operations.

As may be apparent from FIG. 9, while the conventional open storage battery shows a fairly good result, as the battery of curve VIII, if it is used with great care, it is sharply deteriorated, as the batteries of curves VI and VIII, when improperly used. As contrasted, the battery of the present invention, represented by the curve V, shows excellent characteristics over an extended period.

It will be understood from the foregoing description that the enclosed storage battery according to the invention operates while completely absorbing the hydrogen and oxygen gases generated during charging, and is not subjected to a limitation for the amount of electrolyte and charging voltage, as is the conventional enclosed storage battery. Therefore, an enclosed storage battery can be obtained which is large in capacity, long in service life, easy to handle and free of the danger of an electrolyte mist scattering.

Although the present invention has been described and illustrated herein with particular reference to a lead storage battery, the embodiment is only illustrative and it is believed that the concept of the enclosed storage battery according to the invention is also applicable, for example, to alkaline storage battery. In the case of alkaline storage batteries, the carrier for a catalyst is not restricted only to graphite but a relatively stable alumina may also be used as the carrier.

As described above, the present invention which provides a new type of enclosed storage battery which is not subjected to any limitation on the battery capacity and charging voltage, free of the danger of an electrolyte mist scattering, low in cost, easy in handling and long in service life, is of great industrial advantage.

What is claimed is:

1. An enclosed storage battery having electromotive elements comprising a positive electrode, a negative electrode, a separator interposed therebetween and an electrolyte filling the interspaces between said elements and having means, including a catalyst, for combining oxygen and hydrogen generated in the battery, said storage battery further comprising means, including an oxygen supplementing element for supplying oxygen from the atmosphere directly to said catalyst, said oxygen supplementing element being integrally molded with said catalyst into a unitary piece and said unitary piece mounted in a battery casing with said catalyst positioned within an air space in the battery and said oxygen supplementing element being exposed to the atmosphere, said oxygen supplementing element comprising a water repellent porous body molded mainly of an electrolyte resisting fine powder and having fine air passages therein.

2. An enclosed storage battery as defined in claim 1, in which the surface exposed to the atmosphere of said oxygen supplementing element is coated with a thin resin film having fine holes therein.

3. An enclosed storage battery as defined in claim 2, in which said oxygen supplementing element has a cement layer formed on the coating film of its surface exposed to the atmosphere, said cement layer comprising a mixture of a powder of lead compounds, consisting mainly of lead oxide and lead with glycerin.

4. An enclosed storage battery having electromotive elements comprising a positive electrode, a negative electrode, a separator interposed therebetween and electrolyte filling the interspaces between said elements, having means, including a catalyst, for combining oxygen and hydrogen generated in the battery and having means, including an oxygen supplementing element, for supplying oxygen from the atmosphere directly to said catalyst, said oxygen supplementing element being molded integrally with said catalyst into a unitary piece, said unitary piece being mounted in a battery casing with said catalyst positioned within an air space in the battery and said oxygen supplementing element being exposed to the atmosphere, artificial graphite being used as a carrier for said catalyst and artificial graphite being used in said oxygen supplementing element as a base material of a porous body with water repellent powder.

5. An enclosed storage battery having electromotive elements comprising a positive electrode, a negative electrode, a separator interposed therebetween and electrolyte filling the interspaces between said elements, having means, including a catalyst, for combining oxygen and hydrogen generated in the battery and having means, including an oxygen supplementing element for supplying oxygen from the atmosphere directly to said catalyst, said oxygen supplementing element being molded integrally with said catalyst into a unitary piece and said unitary piece being mounted in a battery casing with said catalyst positioned within an air space in the battery and said oxygen supplementing element being exposed to the atmosphere, said electrolyte being a gel electrolyte composed of an aqueous colloidal solution containing 5–20 weight percent of silica and sulfuric acid which contains the sum of an amount required for the gelatinization of the colloidal silica and an amount required for the complete discharge of the electromotive elements in the battery.

* * * * *

UNITED STATES PATENT OFFICE
CERTIFICATE OF CORRECTION

Patent No. 3,622,398　　　　　　　　Dated November 23, 1971

Inventor(s) Satoshi SEKIDO et al

It is certified that error appears in the above-identified patent and that said Letters Patent are hereby corrected as shown below:

In the Claim for Convention Priority, one of three Japanese applications listed therein should be corrected to read --Japan, Patent Appln. N° 41239/69 filed May 29, 1969-- instead of "N° 11239".

Signed and sealed this 27th day of June 1972.

(SEAL)
Attest:

EDWARD M. FLETCHER, JR.　　　　ROBERT GOTTSCHALK
Attesting Officer　　　　　　　　Commissioner of Patents